United States Patent [19]

Dmysh

[11] 3,814,315

[45] June 4, 1974

[54] NOSE-MOUNTED CATALYTIC CARGO TRAILER AND TRUCK BODY HEATERS

[76] Inventor: Anthony Dmysh, 2568 Royal Windsor Dr., R.R. No. 5, Clarkson, Ontario, Canada

[22] Filed: June 15, 1972

[21] Appl. No.: 263,143

[52] U.S. Cl. .................. 237/31, 126/116 B, 98/10
[51] Int. Cl. ............................................. B60h 1/22
[58] Field of Search ......... 237/31, 29, 30, 32; 98/8, 98/10; 62/239, 419; 126/116 B, 110 C

[56] References Cited
UNITED STATES PATENTS

| | | | |
|---|---|---|---|
| 1,991,990 | 2/1935 | Van Vulpen et al. | 98/10 UX |
| 2,256,350 | 9/1941 | Nystrom | 98/10 |
| 2,321,940 | 6/1943 | Robertson | 237/32 |
| 2,372,897 | 4/1945 | Holthouse | 237/30 |
| 2,530,486 | 11/1950 | Steinmetz | 237/30 X |
| 2,730,349 | 1/1956 | Kilbury | 126/110 C X |
| 2,804,066 | 8/1957 | McCutchen | 126/110 C |
| 2,818,059 | 12/1957 | Cayot | 126/116 B X |
| 3,092,220 | 6/1963 | Black | 62/419 X |
| 3,291,199 | 12/1966 | Gutzeit | 165/27 |

Primary Examiner—William E. Wayner
Attorney, Agent, or Firm—Cecil C. Kent and Associates

[57] ABSTRACT

A warm air recirculating housing for accommodating a catalytic heater in the base thereof is secured in air-excluding contact against the exterior side of the front wall of a cargo-carrying trailer or truck body so as to project forwardly from said side. The housing communicates with the trailer interior by way of a warm air discharge opening near the top of the front wall and housing, and by way of an air-return opening near the bottom of said front wall so that the trailer interior is fully utilized for cargo.

2 Claims, 3 Drawing Figures

PATENTED JUN 4 1974 3,814,315
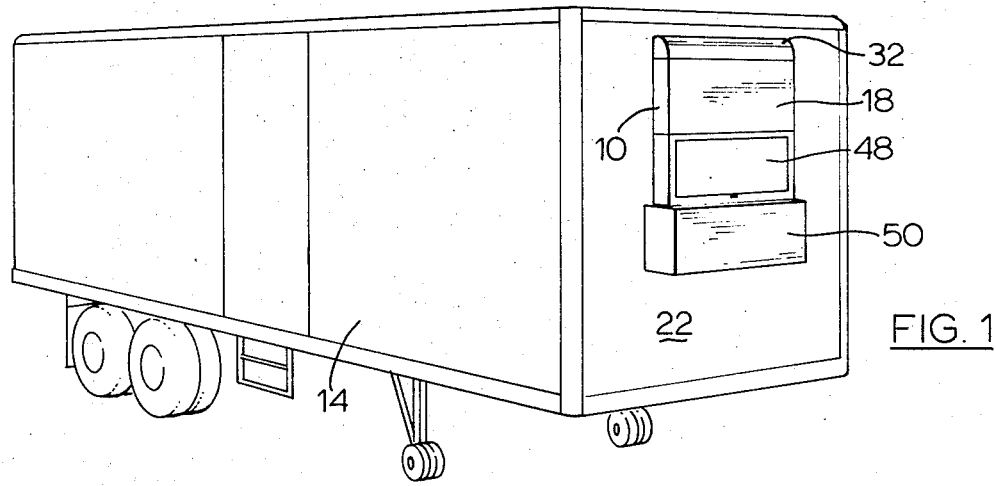
FIG. 1
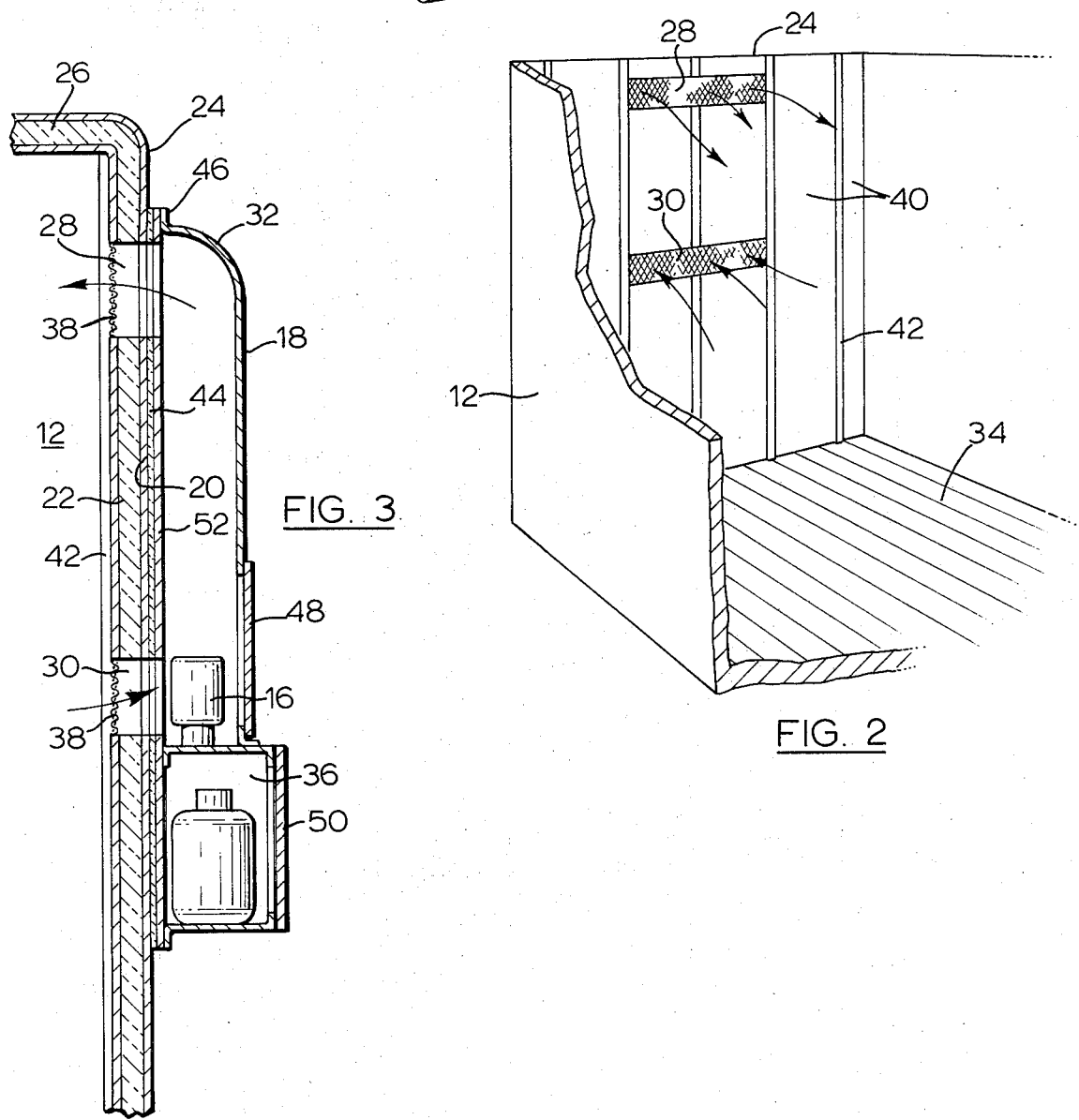
FIG. 3
FIG. 2

3,814,315

NOSE-MOUNTED CATALYTIC CARGO TRAILER AND TRUCK BODY HEATERS

BACKGROUND OF THE INVENTION

The heating of the interiors of cargo trailers has hitherto suffered from the necessity of employing such as heating means from the tractor, or, if from the trailer itself by means within the trailer or below it for instance.

LIMITATIONS OF PRIOR PRACTISE

Known forms of cargo heaters suffer from liability to fire hazard, to being extinguished due to lack of oxygen or by excess draught when the trailer is travelling at speed along a highway. Heating the trailer from the tractor involves coupling up which means that the trailer cannot be heated from the tractor when disconnected. Heating arrangements beneath the tractor suffer from liability to road damage particularly from ice and the like conditions in winter.

OUTLINE OF THE PRESENT INVENTION

The present invention accordingly comprises the combination predominantly of a catalytic heater and a housing therefor when such housing is secured externally to the front wall of the trailer, and includes such front wall as adapted to cooperate with the foregoing by being suitably ported for the discharge of heated air and the return of cooler air for recirculation, together with provision for screening the said ports and for providing air circulation channels in the front wall against the event of certain forms of freight coming right up against said front wall and inhibiting free circulation.

A further novel feature of the invention resides in the provision of a housing for a catalytic heater which requires no open flame, provides better circulation within the trailer, provides completely unobstructed circulation throughout the whole volume of the trailer, requires and consumes no oxygen, cannot get "blown out" or extinguished as a flame-type heater can be extinguished during high road speeds, the housing being thoroughly insulated including around the fuel inlet lines and around the pilot and controls access doors, which access doors provide particularly convenient and easy means for servicing the heater and for replenishing the supply of heating fuel (propane or the like).

With the considerations and inventive objects herein set forth in view, and such others as may become apparent from consideration of this disclosure and specification, the present invention consists of and is hereby claimed to reside in the inventive concept which is comprised, embodied, embraced, or included in any method, process, construction, composition, arrangement or combination or parts, or new use of any of the foregoing which may herein be exemplified in one or more specific embodiments of such concept, reference being had to the accompanying Drawings in which:

FIG. 1 is a perspective representation of a cargo trailer to which the invented nose-mounted heater and housing has been fitted.

FIG. 2 is a fragmentary perspective representation depicting the interior forward end of a cargo trailer interior loading space to which the present invention has been fitted.

FIG. 3 is a longitudinal vertical cross-sectional representation of the present invention.

In the drawings like characters of reference designate similar parts in the several Figures.

CLAIM-CONSONANT PRELIMINARY DESCRIPTION

The present invention consists essentially of exterior means collectively designated 10 for heating the interior generally designated 12 of a cargo trailer 14, comprising in combination with a catalytic heater schematically designated 16, a heater and circulating housing 18 therefor, said housing being vertically oblong in situ and means for securing said housing in air-excluding contact against the exterior side 20 of the front wall 22 of said trailer, the upper end 24 thereof being near the plane of the roof 26 of said trailer, said catalytic heater being disposed within said housing, said front wall having a warm air discharge port 28 thereon and a return air intake port 30, said warm air discharge port being near said roof and communicating with the interior of said housing whereby warm air is permitted to pass from within said housing into the interior loading space of said trailer, said return port communicating with the base of said housing.

The invention also includes the provision of the upper end of the front wall of said housing being curved to approximately a 90° arc from the vertical into the horizontal to form an upwardly and rearwardly curving warm air cowling 32. The invention also includes that the said housing 18 terminates substantially above the plane of the floor 34 of the trailer and includes a fuel housing generally designated 36 below heater 16 and housing 18.

The heating and circulating housing 18 is relatively narrow from back to front and from side to side although wider from side to side than from back to front, being centrally disposed upon the front trailer wall. In addition the front wall ports 28 and 30 are seen to be horizontally oblong and screened as at 38. Further, the front wall is vertically and effectively multi-channelled to provide shallow parallel and vertical air circulating passageways 40, such passageways being provided by spaced vertical slats 42 which may be of wood or the like and of the general cross-sectional dimensions of about two inches wide by about one inch from back to front secured against the interior surface of the front wall.

MAIN DESCRIPTION

It is of great important that the housing 18 be thoroughly well insulated as at 44 by way of the surrounding flange 46 to the front surface 20 of wall 22. All places susceptible to the leakage of warm air from the housing and in addition from the interior of the trailer should, as far as practical be insulated including importantly around the horizontally hinged service doors 48 and 50 leading to the interior of housing 18 and fuel housing 36 respectively.

The housing 18 is provided with a rear wall 52 which of course is also apertured in registration with ports 28 and 30. The housing may be secured to the front wall 22 both around the edges (flange 46) and at suitable locations through the face of 52. By means of the curved cowling 32 warm air is very efficiently guided upwardly and rearwardly to fan out and distribute itself promptly after exit into the interior of the cargo trailer and, after yielding up its thermal energy, recirculating forwardly again to be indrawn through return port 30.

Although a trailer has been referred to herein obviously the invention would apply equally to the front wall of truck bodies and additional advantages resides in the fact that this invention does not use up valuable cargo space within such trailer or truck body, does not expose the cargo to heat damage from direct contact with the heater, and constitutes an arrangement by the use of which the heater is prevented from being damaged during loading and unloading.

Various modifications may be constructed or performed within the scope of the inventive concept disclosed. Therefore what has been set forth is intended to illustrate such concept and is not for the purpose of limiting protection to any herein particularly described embodiment thereof.

What is claimed is:

1. In combination, a cargo trailer, a heater and a housing, said housing accommodating said heater and facilitating air circulation between said heater and the interior of said trailer, said combination being characterised in that:
   i. said heater is a flameless catalytic heater.
   ii. said housing is
      a. secured airtightly against the exterior surface of the front wall of said trailer such that ambient air external to the trailer is excluded from said housing,
      b. vertically oblong, relatively shallow from back to front, and relatively wide from side to side.
   iii. said trailer
      a. during transport of perishable wares being unventilated and airtight so that substantially one and the same air body is re-cycled between the interiors of said housing and said trailer with minimum heat exchange as between said air body and the ambient air,
      b. having horizontally elongated air-circulating ports in the front wall thereof to establish communication between said housing and the interior of said trailer, one of said ports being near the base of said housing and the other near the top to receive a draft of warmed air directed therethrough by convection from said heater, said ports terminating at the front end of said cargo trailer and being free of ductwork extending within said cargo trailer.
   iv. circulation of heated air through said ports and said housing being effected solely by convection and without the use of any other motive device.

2. The invention according to claim 1 in which said ports are screened against the admission of extraneous matter from said trailer interior to said housing interior, and said heater is positioned adjacent the base of said housing.

* * * * *